(12) United States Patent
Djukic et al.

(10) Patent No.: US 10,887,017 B2
(45) Date of Patent: Jan. 5, 2021

(54) MULTI-RANGE COMMUNICATION SYSTEM

(71) Applicant: Zinwave, Ltd., Dallas, TX (US)

(72) Inventors: Slavko Djukic, Corinth, TX (US); James Martin, Midland, TX (US)

(73) Assignee: Zinwave, Ltd., Dallas, TX (US)

(*) Notice: Subject to any disclaimer, the term of this patent is extended or adjusted under 35 U.S.C. 154(b) by 0 days.

(21) Appl. No.: 16/799,427

(22) Filed: Feb. 24, 2020

(65) Prior Publication Data
US 2020/0274617 A1 Aug. 27, 2020

Related U.S. Application Data

(60) Provisional application No. 62/809,601, filed on Feb. 23, 2019.

(51) Int. Cl.
*H04B 10/00* (2013.01)
*H04B 10/2575* (2013.01)
(Continued)

(52) U.S. Cl.
CPC ....... *H04B 10/25753* (2013.01); *H04B 10/27* (2013.01)

(58) Field of Classification Search
CPC .......... H04B 10/2575; H04B 10/25751; H04B 10/25752; H04B 10/25753;
(Continued)

(56) References Cited

U.S. PATENT DOCUMENTS

| 10,090,902 B2 | 10/2018 | Wala |
| 10,110,309 B2 | 10/2018 | Cho et al. |

(Continued)

FOREIGN PATENT DOCUMENTS

| CN | 108390702 A | 12/2017 |
| WO | 2004054276 A2 | 6/2004 |

(Continued)

OTHER PUBLICATIONS

UK Search Report for Application No. GB2002559.9 dated Oct. 28, 2020.

*Primary Examiner* — Daniel G Dobson
(74) *Attorney, Agent, or Firm* — Maynard Cooper & Gale, P. C.; Brian T. Sattizahn

(57) ABSTRACT

A multi-range communication system is provided that can be expanded to support communications using both RF signals and millimeter wave signals without having to install entirely new systems to support communication of the signals. The communication system can use one or more shared optical fibers to simultaneously communicate both RF signals and millimeter wave signals in different ranges between network devices and mobile devices. The communication system permits the co-location of components for the communication system for the different ranges, which can result in substantially similar coverage areas for each of the ranges supported by the communication system. In addition, the corresponding equipment used for communicating signals in each of the ranges can be powered from a common DC power source. The supplied power can be configured for each piece of equipment, and corresponding range, such that the substantially similar coverage areas are obtained.

19 Claims, 13 Drawing Sheets

(51) Int. Cl.
*H04B 10/27* (2013.01)
*H04J 14/00* (2006.01)

(58) Field of Classification Search
CPC ........ H04B 10/25754; H04B 10/25755; H04B 10/25756; H04B 10/25758; H04B 10/25759
See application file for complete search history.

(56) References Cited

U.S. PATENT DOCUMENTS

| | | |
|---|---|---|
| 10,153,814 B1 | 12/2018 | Liang et al. |
| 10,186,770 B2 | 1/2019 | Gears et al. |
| 10,194,327 B1 | 1/2019 | Khan |
| 2002/0187809 A1 | 12/2002 | Sanjay et al. |
| 2004/0203339 A1* | 10/2004 | Bauman ........... H04B 10/25756 455/7 |
| 2006/0083512 A1* | 4/2006 | Wake ..................... H04J 14/02 398/59 |
| 2018/0368149 A1 | 12/2018 | Raghavan et al. |
| 2019/0068250 A1 | 2/2019 | Kim et al. |
| 2019/0239088 A1 | 8/2019 | Berlin et al. |
| 2019/0245639 A1 | 8/2019 | He et al. |
| 2019/0253145 A1 | 8/2019 | Prentice et al. |
| 2020/0028590 A1* | 1/2020 | Lim .................... H04B 10/503 |

FOREIGN PATENT DOCUMENTS

| | | |
|---|---|---|
| WO | 2012024247 A1 | 2/2012 |
| WO | 2012148940 A1 | 11/2012 |
| WO | 2018135853 A1 | 7/2018 |

\* cited by examiner

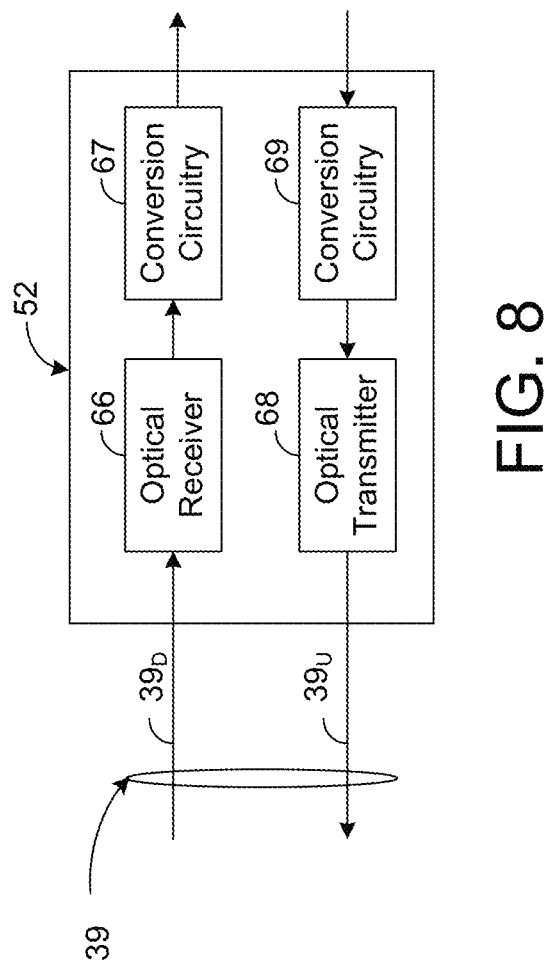

MULTI-RANGE COMMUNICATION SYSTEM

CROSS REFERENCE TO RELATED APPLICATIONS

This application claims the benefit of U.S. Provisional Patent Application No. 62/809,601, entitled "MULTI-RANGE COMMUNICATION SYSTEM", filed on Feb. 23, 2019, which application is hereby expressly incorporated herein by reference in its entirety.

BACKGROUND

The present application describes a communication system that can send and receive message via several different frequency ranges using one or more shared components.

Distributed antenna systems can be used to enable communications between network devices and mobile devices within a particular frequency range. Typically, the configuration of the distributed antenna system is customized for the particular frequency range being used. When a new frequency range is to be used for communications between network devices and mobile devices, all new equipment and cabling for the new frequency range has to be installed. The cost to effectively add a new distributed antenna to an existing distributed antenna system can be quite expensive and time consuming. Therefore, what is needed is a distributed antenna system that can be scaled by reusing components when adding additional frequency ranges for communication via the distributed antenna system.

SUMMARY

The present application is directed to a distributed antenna system that can be expanded to support communications using both RF signals and millimeter wave signals in different ranges without having to install entirely new systems to support communication of the signals. The distributed antenna system can use one or more shared optical fibers to simultaneously communicate both RF signals and millimeter wave signals in different ranges between network devices and mobile devices. The distributed antenna system permits the co-location of components for the distributed antenna system for the different ranges, which can result in substantially similar coverage areas for each of the ranges supported by the distributed antenna system. In addition, the corresponding equipment used for communicating signals in each of the ranges can be powered from a common DC power source. The supplied power can be configured for each piece of equipment, and corresponding range, such that the substantially similar coverage areas are obtained.

One advantage of the present application is that it provides an efficient indoor architecture for all ranges below 6 GHz and millimeter wave ranges.

Another advantage of the present application is that it provides for the co-location of equipment for "low-band" (e.g., 130 MHz to 2.7 GHz), "mid-band" (e.g., 3 GHz to 6 GHz) and "millimeter wave band" (e.g., 24 GHz, 28 GHz, or 39 GHz) communication.

A further advantage of the present application is that the cabling that is installed in the distributed antenna system for a first range of communications can be reused when adding other ranges of communications to the distributed antenna system.

Other features and advantages of the present application will be apparent from the following more detailed description of the identified embodiments, taken in conjunction with the accompanying drawings, which show, by way of example, the principles of the application.

BRIEF DESCRIPTION OF THE DRAWINGS

FIG. 8 shows a block diagram of an embodiment of an optical module.

Wherever possible, the same reference numbers are used throughout the drawings to refer to the same or like parts.

DETAILED DESCRIPTION

Figure 1A:
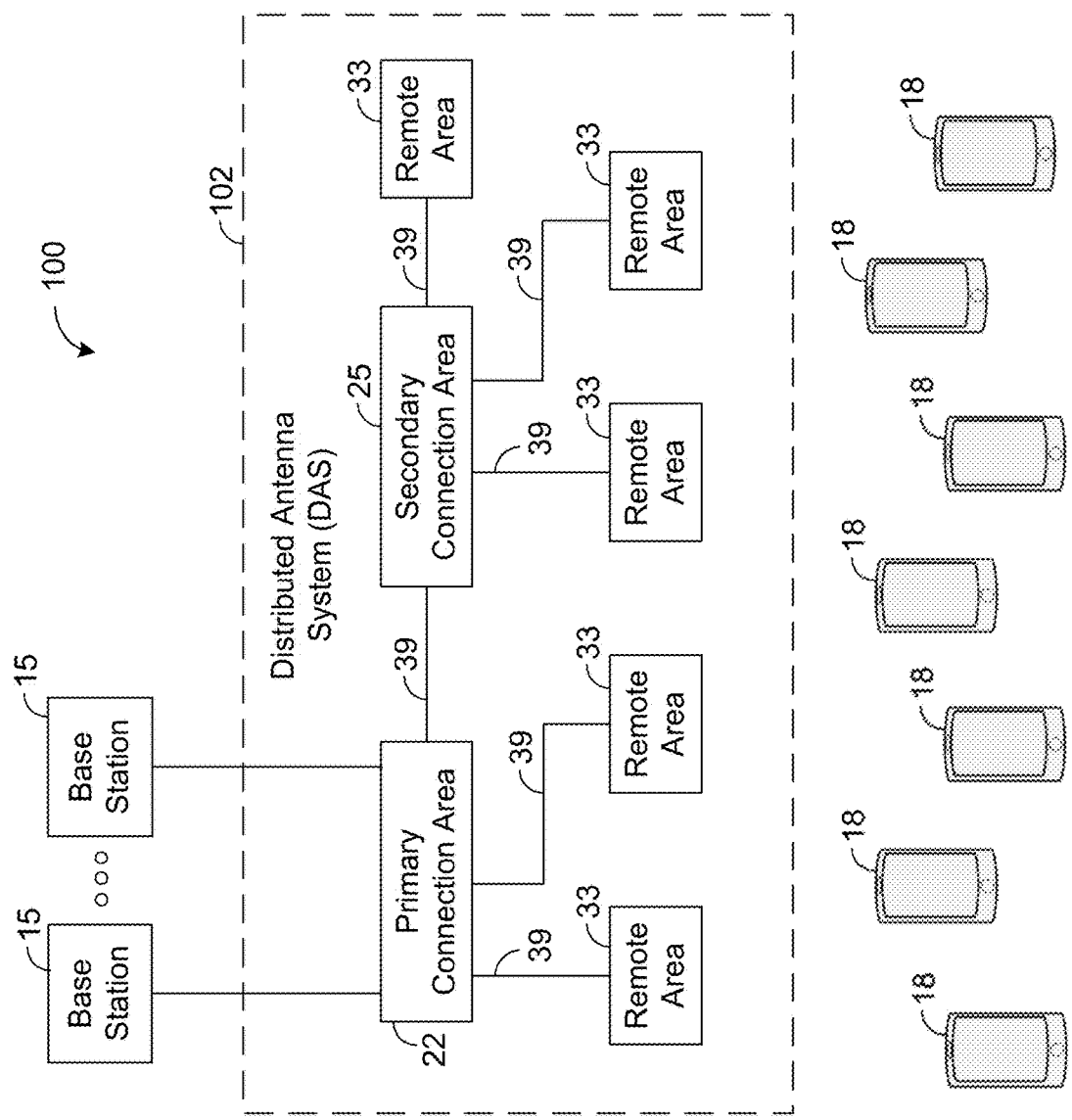
FIGS. 1A and 1B show block diagrams of different embodiments of a communication system.
Figure 1B:
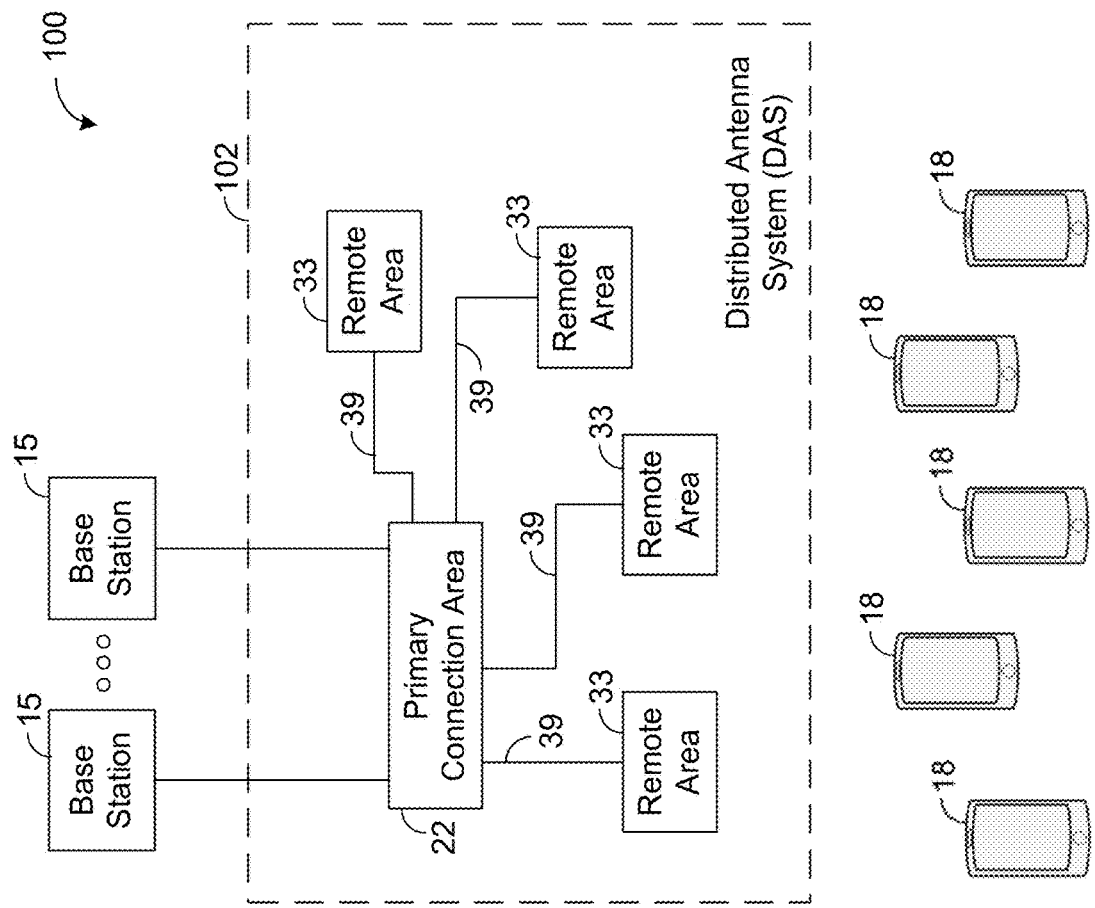

FIGS. 1A and 1B shows different embodiments of a communication system 100 having a distributed antenna system (DAS) 102 for wirelessly communicating signals between at least one base station (or network communication device) 15 (e.g., a radio frequency (RF) source or a millimeter wave (mmwave) source) and numerous mobile communication devices 18. The system 100 may be employed in a variety of applications, for example, where coverage by communication networks (e.g., cellular, WiFi, etc.) is limited or where a high density of communication devices 18 are typically used and employed, such as sporting venues, public squares, casinos, convention centers, hotels, and other similar venues. The DAS 102 of FIGS. 1A and 1B has a primary connection area 22 that can include the corresponding equipment (e.g., a hub or other device) that is used to connect the DAS 102 to one or more base stations 15 to enable communication between the DAS 102 and the one or more base stations 15. The base station(s) 15 may function as a gateway to one or more existing communications systems, such as the different cellular phone networks of different carriers, the internet, fiber optic networks, etc.

In an embodiment, the DAS 102 may facilitate communications between a number of disparate networks that are accessible from the base station(s) 15 and the disparate mobile communication devices 18 that operate on those networks. Although the DAS 102 may operate in a variety of manners (e.g., by providing a plurality of communication paths for different devices to communicate with different networks), in an embodiment as described herein, the DAS 102 may function as a wideband DAS, that communicates RF and/or mmwave signals between the base station(s) 15 and the mobile communication devices 18 over a wide range of frequencies that are at least 1 octave apart. In other embodiments, the range of frequencies that may be communicated can be one, two, or greater orders of magnitude apart. In an embodiment, the DAS 102 can simultaneously communicate in one or more of the following distinct frequency ranges: 130 MHz to 2.7 GHz; 3 GHz to 6 GHz (e.g., to accommodate any such signals in this range including the 5.9 GHz ISM band); and 20 GHz to 40 GHz (e.g., at frequencies of about 24 GHz, about 28 GHz, and about 39 GHz). In this manner, the DAS 102 may facilitate communications over multiple different communication and network protocols over a single DAS 102, with the underlying RF and/or mmwave communication signals being communicated over shared communication mediums without modification. In an embodiment, DAS 102 may provide for end-to-end communications between the base station(s) 15 and the mobile communication devices 18, without performing any modulation (e.g., RF modulation) of the disparate signals that are communicated over differing networks and via differing protocols. All communications may be routed through DAS 102 without modulation, for example, via fiber optic communication links that employ optical signal modulation between RF conversion stages (if needed), as described herein. Additional information regarding the operation of a DAS can be found in U.S. Pat. No. 10,186,770, granted on Jan. 22, 2019, and entitled "Flexible Distributed Antenna System Using a Wideband Antenna Device," which patent is hereby incorporated by reference in its entirety.

Referring back to FIGS. 1A and 1B, the base station(s) 15 may be coupled to equipment in a primary connection area 22 of DAS 102. As shown in FIG. 1A, the equipment at the primary connection area 22 may be coupled to equipment in at least one other secondary connection area 25 and/or equipment in one or more remote areas 33 and the secondary connection area 25 may be coupled to equipment in one or more remote areas 33 resulting in the DAS 102 having a "double-star architecture." In contrast, as shown in FIG. 1B, the equipment at the primary connection area 22 may be coupled to equipment in one or more remote areas 33 resulting in the DAS 102 having a "single-star architecture."

In FIG. 1A, the equipment at the primary connection area 22 may function as a primary node and the equipment at the secondary connection area 25 may function as a branch or peripheral node. Equipment at each remote area 33 (e.g., an optical unit and antenna or radio) can provide for a communication endpoint with mobile devices 18 (e.g., via RF transmissions through an antenna or mmwave transmissions from a radio). Further, equipment at each secondary connection area 25 may provide for connections to equipment at additional remote areas 33 as well as equipment at additional secondary connection areas 25. For simplicity of illustration, FIG. 1A shows a single secondary connection area 25. However, the equipment at primary connection area 22 may be interfaced with equipment at multiple secondary connection areas 25, and equipment at the secondary connection areas 25 may be further interfaced with equipment at multiple additional secondary connection areas 25 to form a DAS 102 of any desired size or scale (e.g., as a multi-star distributed antenna system if more than one secondary connection area 25 is used). The equipment at secondary connection areas 25 may in turn be coupled to equipment at additional remote areas 33, which permits the DAS 102 to be employed over large physical areas and for scalability to dozens or even hundreds of remote areas 33 over unique physical environments.

The equipment at the primary connection area 22 may be coupled to equipment at the secondary connection area(s) 25 and the equipment at the remote area 33 by respective optical fiber connections 39. Similarly, the equipment at the secondary connection area(s) 25 may be coupled to equipment at other secondary connection area(s) 25 and equipment at remote areas 33 by respective optical fiber connections 39. In other words, the DAS 102 can provide a "fiber to the edge" configuration such that only optical fibers connections are used for communication between the equipment at the primary connection area 22 and the equipment at the remote areas 33 regardless of the specific configuration of the DAS 102.

In an embodiment, each optical fiber connection 39 may include a plurality of fiber strands (e.g., 8) to provide different physical fiber links for uplink and downlink communications over DAS 102 for the different frequency ranges supported by the DAS 102. In other embodiments, other types of communication connections may be used. However, the signals that are communicated through the DAS 102 (e.g., the underlying RF communication signal and/or the underlying mmwave communication signal) need to be retained or reconstructed at both ends of the DAS 102 to enable communications with mobile devices 18 and base stations 15. Accordingly, as will be described in more detail hereafter, any of the components of the DAS 102, such as equipment at the primary connection area 22, secondary connection area(s) 25, and remote areas 33, may employ RF amplifiers that amplify corresponding signals for RF communications. The RF amplifiers may be configured and coupled in a manner that reduces undesired signal characteristics such as linear distortions (e.g., second order linear distortion) on the output RF signal, which might otherwise occur during gain stages.

In the downstream direction, the equipment at the primary connection area 22 may receive signals (e.g., multiple RF signals, mmwave signals or other type of signals over a wideband) to be communicated to different ones of mobile communication devices 18 (e.g., to different subscribers on different cellular networks). In an embodiment, the equipment at the primary connection area 22 can include multiple service modules, processors, memory devices, and RF communication devices and switches that facilitate the combination of the incoming RF traffic into common RF data (e.g., to combine and balance the mix of cellular service signals and other RF signals into one wideband composite RF signal). The output RF data is provided to one or more optical modules at the primary connection area 22. The optical modules can modulate the RF signals for transmission as an optical signal over optical fibers 39. In an embodiment, the modulation of the RF signals does not change the underlying RF signal, but instead, merely provides an optical carrier signal for the underlying RF signals without conversion into a digital signal. However, in other embodiments other suitable modulation techniques can be used. The resulting downstream (or downlink) optical signal for the optical module can be transmitted over the optical fibers 39 (e.g., over a strand of the optical fiber 39 selected for downlink communications). Although in an embodiment, the same downlink signal may be transmitted over each of the optical fibers 39 connected to a piece of equipment. In other embodiments, different downlink signals with different RF signals may be routed to equipment at different remote areas 33 or secondary connection areas 25 (e.g., based on knowledge and/or predictions regarding the locations of various mobile communication devices 18 relative to components of the DAS 102).

Equipment at the remote area 33 may receive the downlink signal (e.g., the optical signal including an optical carrier and the underlying RF signals) from the equipment at the primary connection area 22 and output the underlying RF content received from the base station 15 to the mobile devices 18 via a local antenna at the remote area 33. In an embodiment, the received optical signal may be converted to the electrical domain, for example, by demodulating the optical carrier to output the underlying RF electrical content. However, while the underlying RF signal may maintain its underlying content (e.g., relative frequency, phase, amplitude, etc.) as a result of optical transmission and conversion, the signal may need to be amplified by a corresponding gain stage prior to transmission to the mobile communication devices 18.

Equipment at each secondary connection area 25 may include suitable processors, memory, hardware, and software to facilitate the distribution of the signals (e.g., optical signals carrying RF content and/or mmwave content) throughout the DAS 102. In an embodiment, equipment at the secondary connection area 25 may include a plurality of optical modules that transmit or receive optical signals, with the receiving optical modules converting the incoming optical signal into a RF signal and the transmitting optical modules converting RF signals into the outgoing optical signal. Internal processing of the RF signals by equipment at the secondary connection area 25 may in some instances require one or more gain stages. In other embodiments, the equipment at the secondary connection area 25 may route optical systems between various locations, without intermediate RF conversion within the secondary connection area 25, such as when mmwave signals are being communicated. In some embodiments, the equipment at the secondary connection area 25 may perform some portion of the functionality provided by the equipment at the remote area 33, for example, by providing for transmission of an RF signal from antennas or transmission of a mmwave signal from a radio coupled directly to the equipment at the secondary connection area 25.

In the upstream direction, the mobile communication devices 18 may wirelessly transmit a signal (e.g., a RF signal or a mmwave signal) to be received by the base station(s) 15. The signals from the mobile communication devices 18 may be received by equipment at any of the remote areas 33 based on the location of the mobile communication devices 18 relative to the equipment at the remote areas 33. In an embodiment, in which the equipment at the remote areas 33 communicate with equipment at the primary connection area 22 and/or secondary connection area(s) 25 via optical communications, a RF signal received by the equipment at the remote area 33 may be converted to the optical domain and transmitted to the equipment at the primary connection area 22 or the equipment at the secondary connection area 25 via corresponding optical fibers 39 (e.g., over a strand of the optical fiber 39 selected for uplink communications). The optical fiber 39 may then provide the optical signal to the equipment at the primary connection area 22 (if the previous signal was sent to the equipment at the secondary connection area 25) via an optical fiber 39. The equipment at the primary hub 22 may then convert the optical signal to a signal (e.g., a RF electrical signal or mmwave signal) for transmission of the signal to the base station 15. In an embodiment, if the signal is an RF electrical signal, one or more RF amplification stages may be required. The base station(s) 15 may then provide the output signals to the target communication networks (e.g., by distinguishing and selectively distributing via different ranges and communication protocols).

Figure 2A:
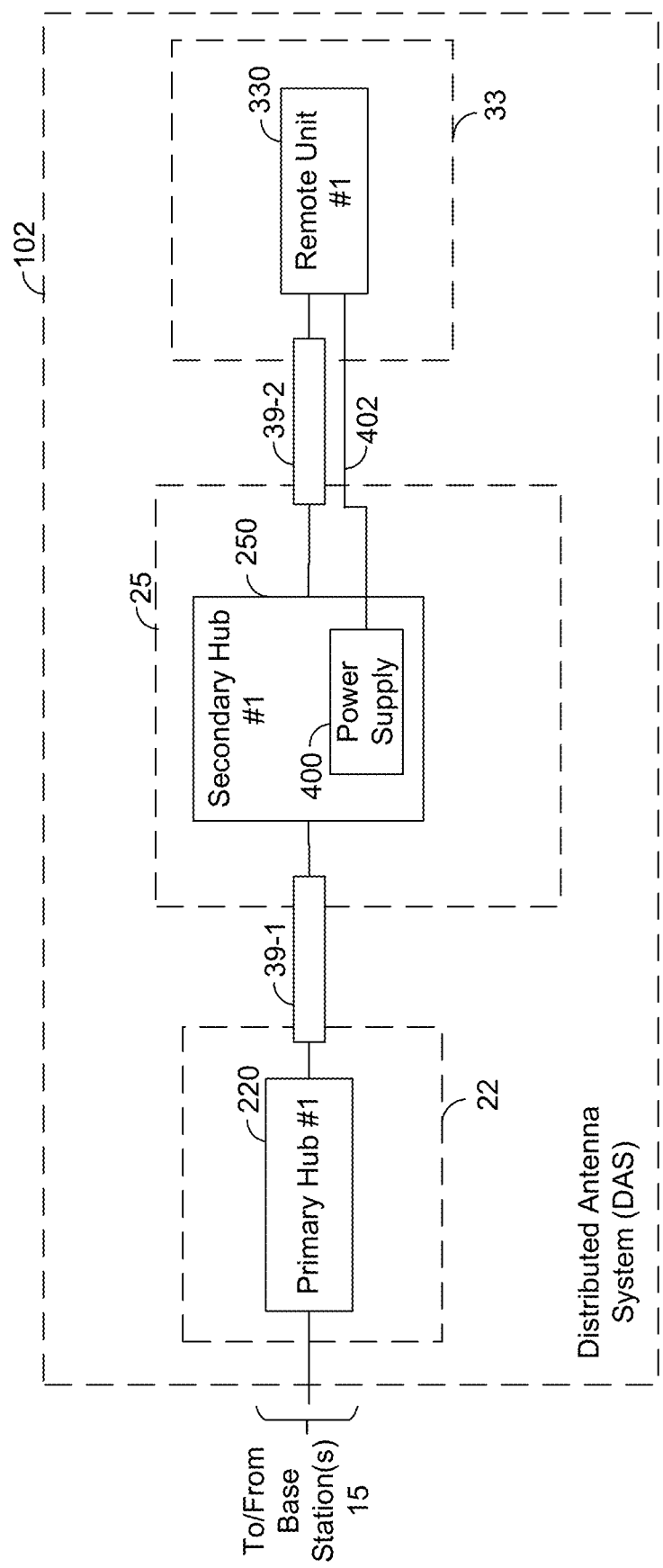
FIGS. 2A-5B show block diagrams of different embodiments of a distributed antenna system.
Figure 3A:
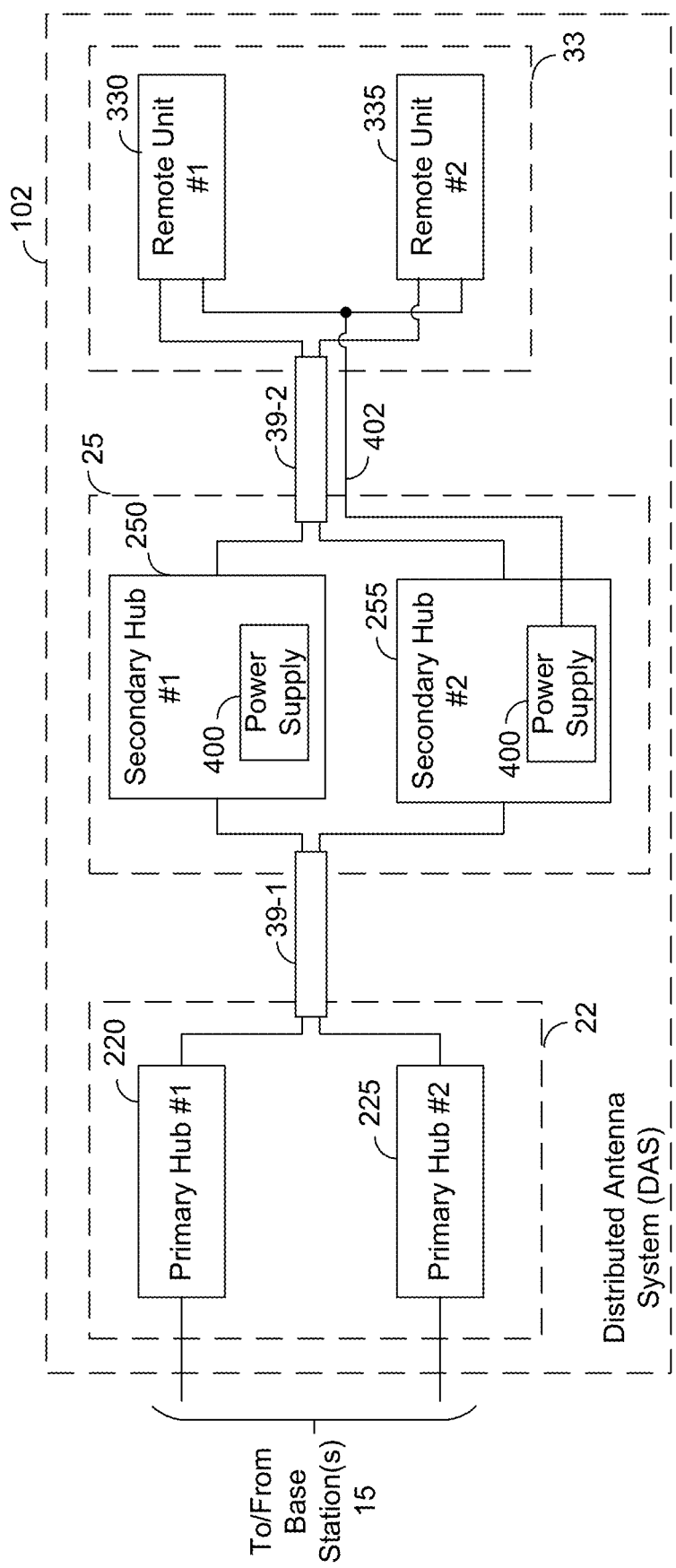
Figure 3B:
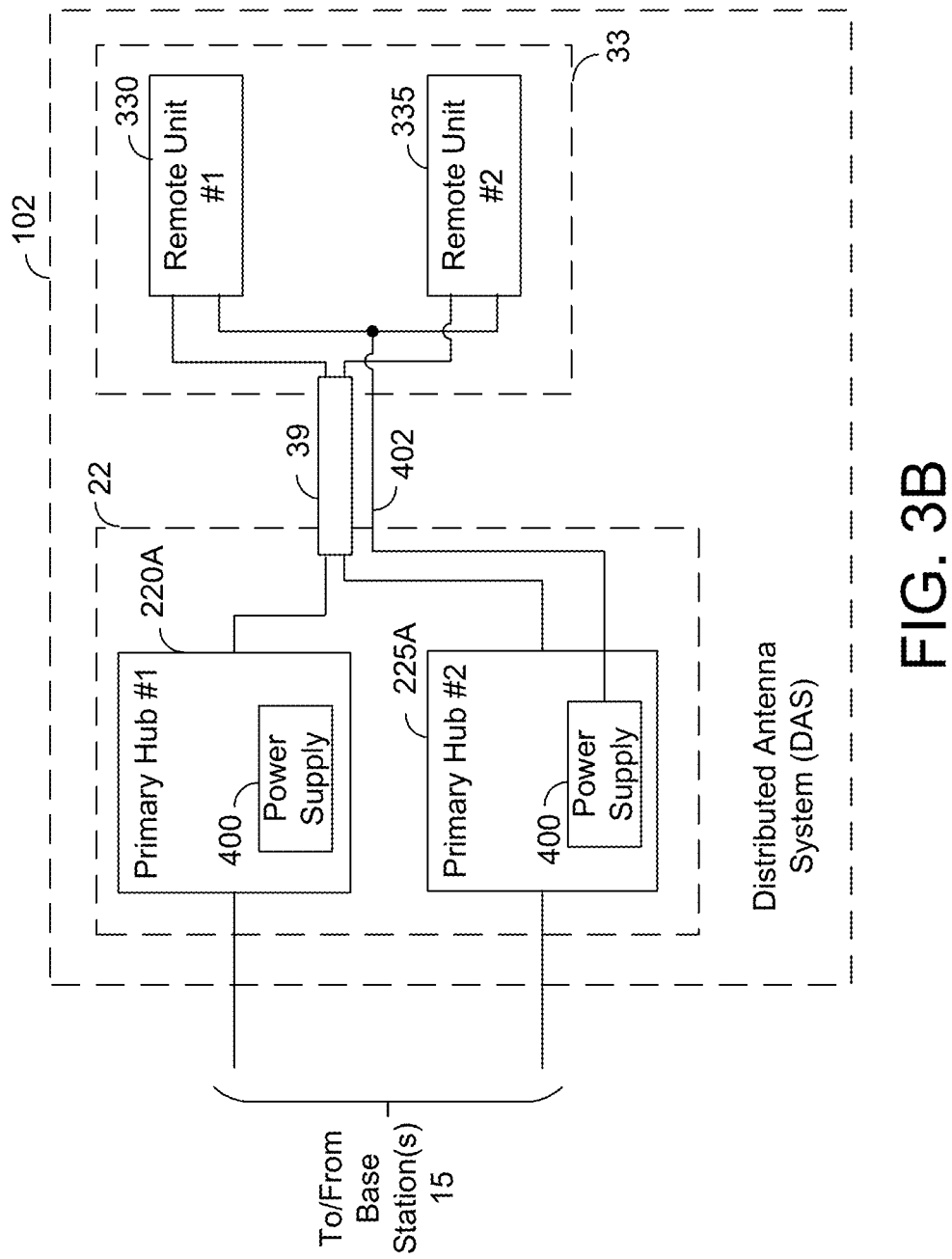
Figure 4A:
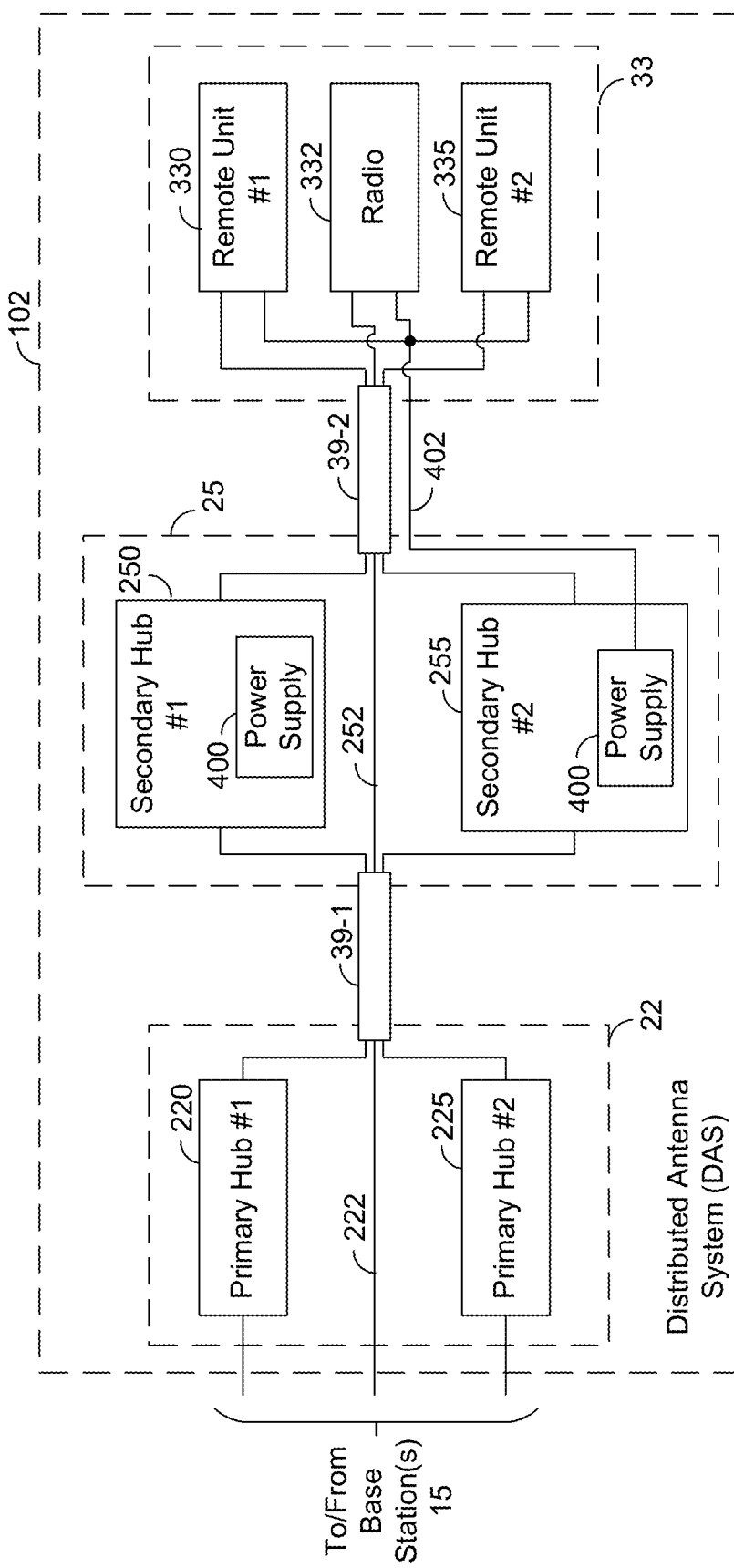
Figure 4B:
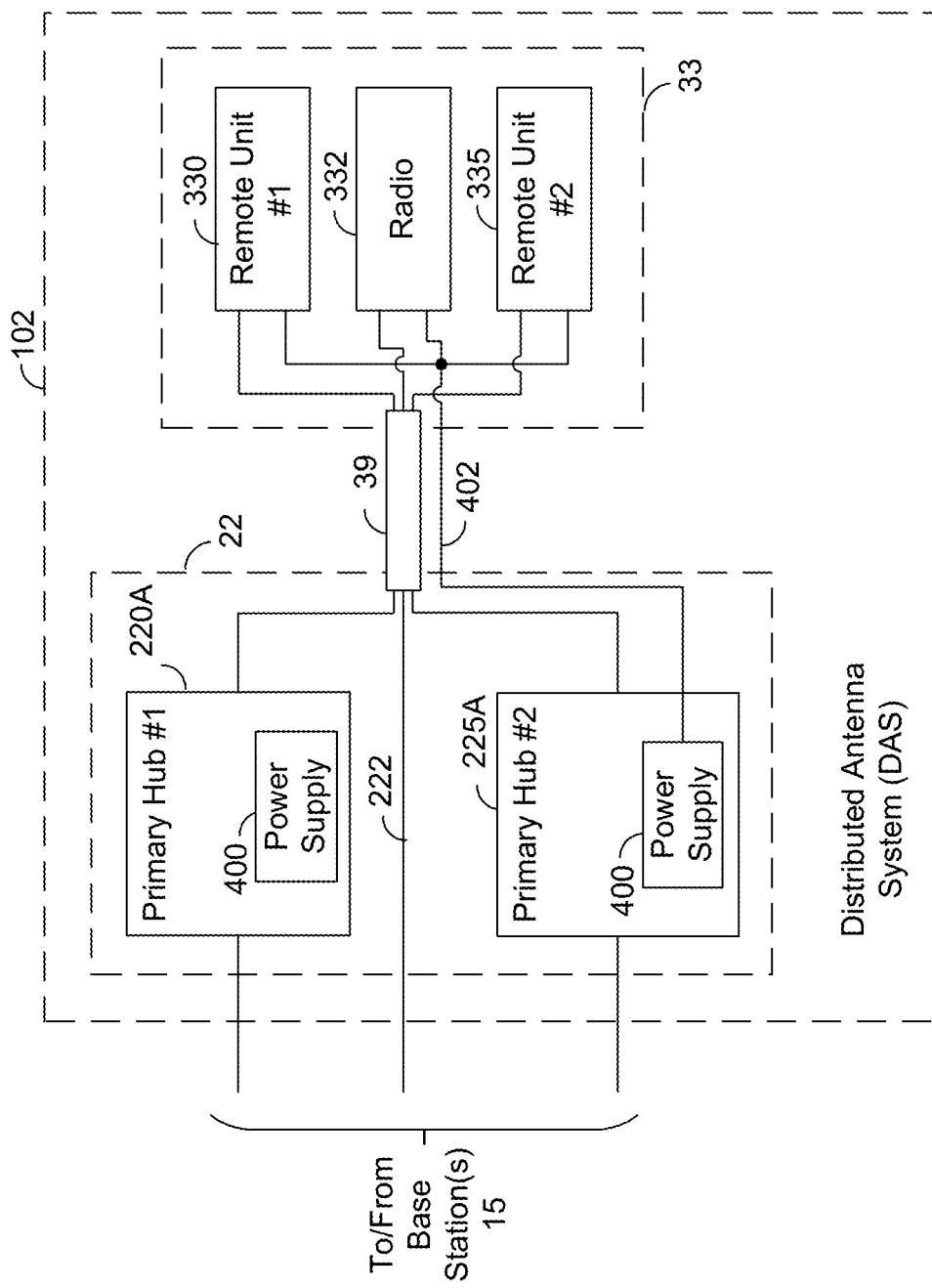
Figure 5A:
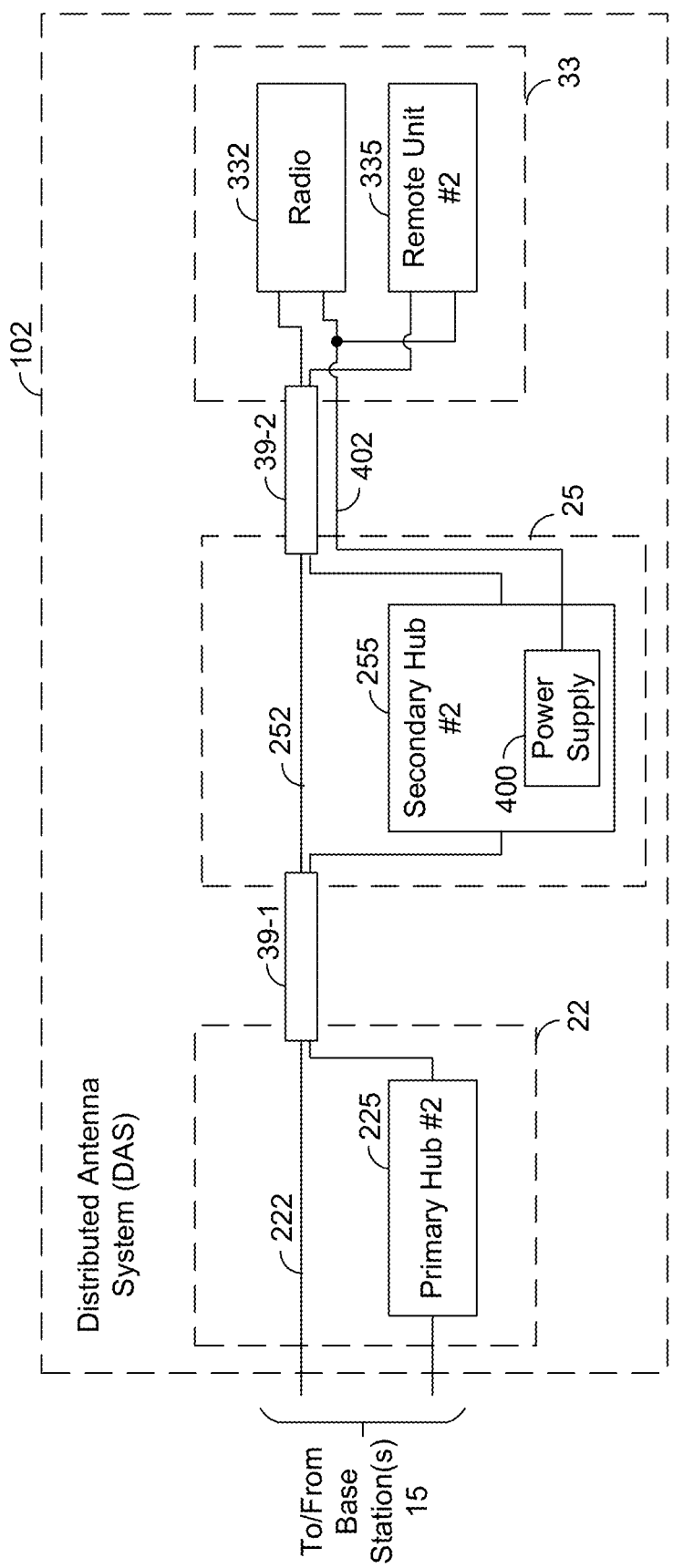
Figure 5B:
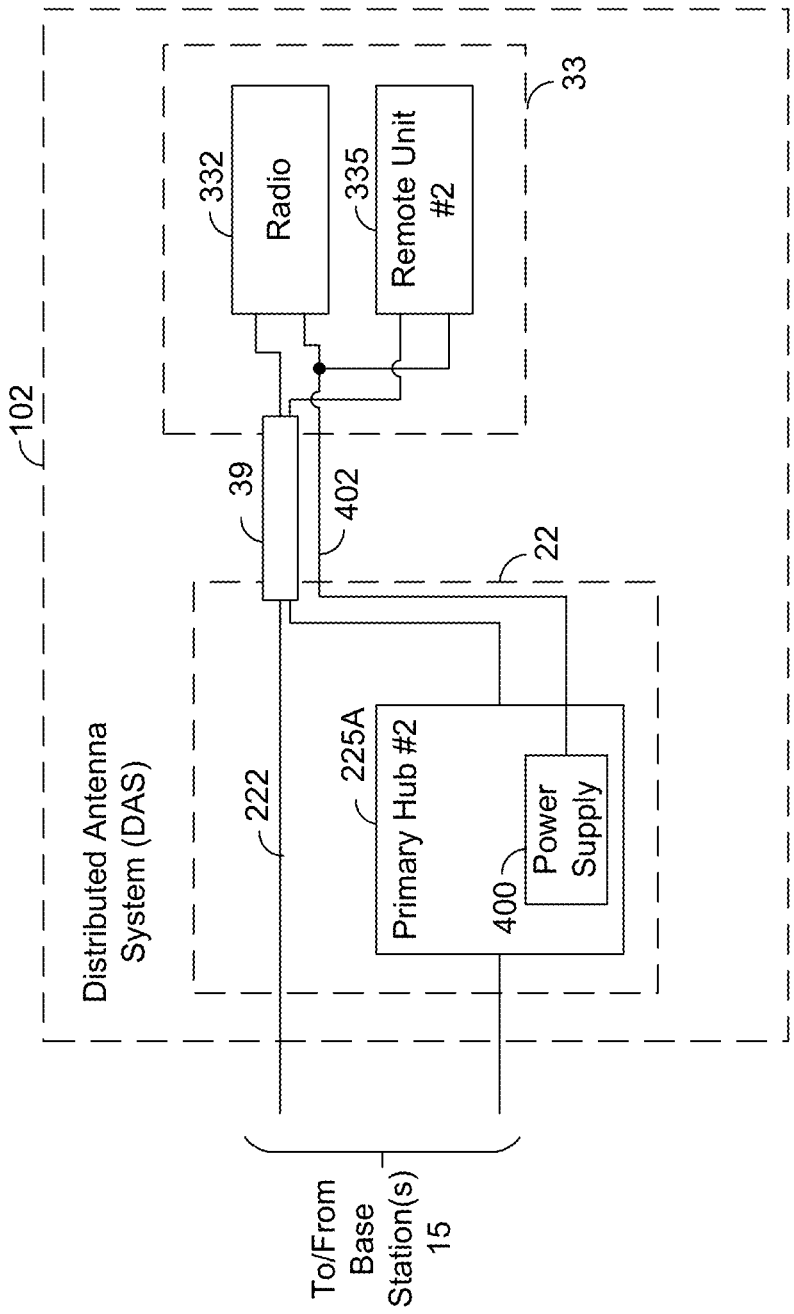

FIGS. 2A-5B show different embodiments of the DAS 102 that can use some common components and areas to provide one or more ranges (e.g., 130 MHz to 2.7 GHz; 3 GHz to 6 GHz; and/or 20 GHz to 40 GHz) of communications to the mobile communication devices 18. FIGS. 2A and 2B show embodiments of the DAS 102 that can be used to facilitate communications between base stations 15 and the mobile communication devices 18 in the 130 MHz to 2.7 GHz range. FIGS. 3A and 3B show embodiments of the DAS 102 that can be used to facilitate communications between base stations 15 and the mobile communication devices 18 in one or both the 130 MHz to 2.7 GHz range and/or the 3 GHz to 6 GHz range. FIGS. 4A and 4B show embodiments of the DAS 102 that can be used to facilitate communications between base stations 15 and the mobile communication devices 18 in one, two or all of the 130 MHz to 2.7 GHz range, the 3 GHz to 6 GHz range; and/or the 20 GHz to 40 GHz range. FIGS. 5A and 5B show embodiments of the DAS 102 that can be used to facilitate communications between base stations 15 and the mobile communication devices 18 in one or both of the 3 GHz to 6 GHz range and/or the 20 GHz to 40 GHz range.

Referring back to FIGS. 2A and 2B, a DAS 102 is shown that facilitates communications between base stations 15 and mobile communication devices 18 in a first range (e.g., 130 MHz to 2.7 GHz). As shown in FIG. 2A, the primary connection area 22 can include a primary hub 220 that is coupled to one or more base stations 15. The primary hub 220 can receive RF signals in the first range from the base stations 15 and generate corresponding optical signals (e.g., modulate the RF signals on an optical signal) for transmission on a first optical fiber 39-1. Similarly, the primary hub 220 can receive optical signals from the first optical fiber 39-1 and generate corresponding RF signals (e.g., de-modulate the RF signals from the optical signal) for transmission to the base stations 15. In one embodiment, the primary hub 220 can be connected to 2 strands (e.g., 1 for uplink communications and 1 for downlink communications) of the first optical fiber 39-1.

The first optical fiber 39-1 can be used to connect the primary hub 220 (and any other equipment at the primary connection area 22) to a secondary hub 250 (and any other equipment) at the secondary connection area 25. The secondary hub 250 can be used to transfer the optical signals from the first optical fiber 39-1 to a second optical fiber 39-2. In an embodiment, the secondary hub 250 can de-modulate the RF signals from the optical signal received from the first optical fiber 39-1 and then modulate the RF signals onto an optical signal for transmission via the second optical fiber 39-2. In another embodiment, the secondary hub 250 can provide the optical signal from the first optical fiber 39-1 to the second optical fiber 39-2 without modulation. Similarly, the secondary hub 250 can transfer the optical signals from the second optical fiber 39-2 to the first optical fiber 39-1. In one embodiment, the secondary hub 250 can be connected to 2 strands (e.g., 1 for uplink communications and 1 for downlink communications) of the second optical fiber 39-2.

In addition, the secondary hub 250 can include a power supply 400. The power supply 400 can be used to power equipment at the second connection area 25 and equipment at any remote areas 33 connected to the second connection area 25. In one embodiment, the power supply 400 can provide a DC voltage (e.g., +48 V or −48 V) to power the equipment. The power supply 400 can provide the DC voltage to the equipment in remote area 33 via a power connection 402 that is connected between the secondary connection area 25 and the remote area 33. In one embodiment, the power connection 402 can routed along the same path as the second optical fiber 39-2. In another embodiment, the power connection 402 may be integrated within the optical fiber 39-2 to form a composite cable.

The second optical fiber 39-2 can be used to connect the secondary hub 250 (and any other equipment at the secondary connection area 25) to a remote unit 330 (and any other equipment) at the remote area 33. The remote unit 330 can receive optical signals from the second optical fiber 39-2 and generate corresponding RF signals (e.g., de-modulate the RF signals from the optical signal) for transmission to the mobile communication devices 18. Similarly, the remote unit 330 can receive RF signals from the mobile communication devices 18 and generate corresponding optical signals (e.g., modulate the RF signals on the optical signal) for transmission via the second optical fiber 39-2.

Figure 2B:
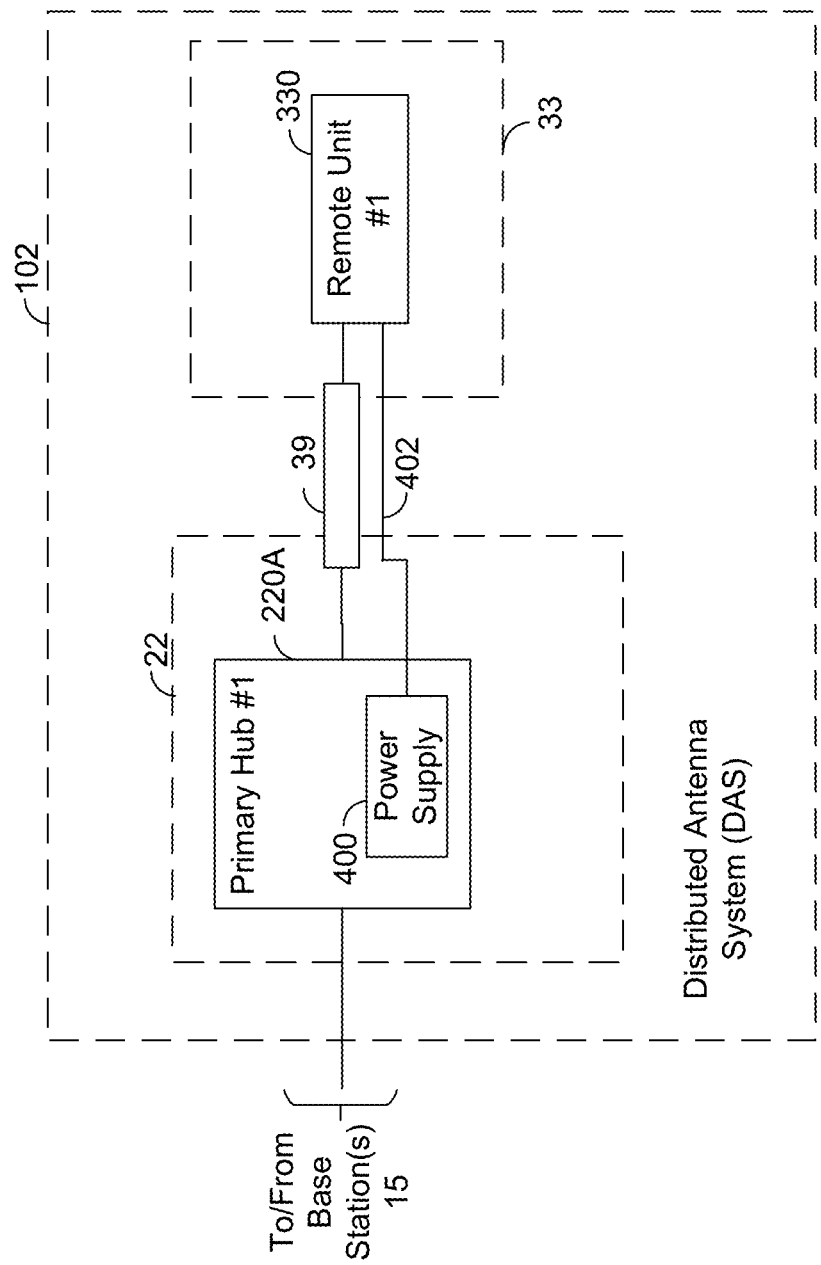

As shown in FIG. 2B, the primary connection area 22 can include a primary hub 220A that is coupled to one or more base stations 15. The primary hub 220A can receive RF signals in the first range from the base stations 15 and generate corresponding optical signals (e.g., modulate the RF signals on an optical signal) for transmission on optical fiber 39. Similarly, the primary hub 220A can receive optical signals from the optical fiber 39 and generate corresponding RF signals (e.g., de-modulate the RF signals from the optical signal) for transmission to the base stations 15. In one embodiment, the primary hub 220A can be connected to 2 strands (e.g., 1 for uplink communications and 1 for downlink communications) of the optical fiber 39.

In addition, the primary hub 220A can include a power supply 400. The power supply 400 can be used to power equipment at any remote areas 33 connected to the primary connection area 22. In one embodiment, the power supply 400 can provide a DC voltage (e.g., +48 V or −48 V) to power the equipment. The power supply 400 can provide the DC voltage to the equipment in remote area 33 via a power connection 402 that is connected between the primary connection area 22 and the remote area 33. In one embodiment, the power connection 402 can routed along the same path as the optical fiber 39. In another embodiment, the power connection 402 may be integrated within the optical fiber 39 to form a composite cable.

The optical fiber 39 can be used to connect the primary hub 220A (and any other equipment at the primary connection area 22) to a remote unit 330 (and any other equipment) at the remote area 33. The remote unit 330 can receive optical signals from the optical fiber 39 and generate corresponding RF signals (e.g., de-modulate the RF signals from the optical signal) for transmission to the mobile communication devices 18. Similarly, the remote unit 330 can receive RF signals from the mobile communication devices 18 and generate corresponding optical signals (e.g., modulate the RF signals on the optical signal) for transmission via the optical fiber 39.

Referring to FIGS. 3A and 3B, a DAS 102 is shown that facilitates communications between base stations 15 and mobile communication devices 18 in one or more of a first range (e.g., 130 MHz to 2.7 GHz) and a second range (e.g., 3 GHz to 6 GHz). The operation of the DAS 102 with respect to communications using the first range is the same as described above for the DAS 102 of FIGS. 2A and 2B. For communications in the second range, the DAS 102 of FIGS. 3A and 3B can use several of the same components (e.g., optical fiber 39, first optical fiber 39-1, second optical fiber 39-2, power supply 400 and power connection 402) that were used for communications in the first range. In other words, the DAS 102 from FIGS. 2A and 2B can be expanded (as shown in FIGS. 3A and 3B) to provide equipment and support for communications in the second range. As shown in FIG. 3A, the primary connection area 22 can include a primary hub 225 (in addition to primary hub 220) that is coupled to one or more base stations 15. The primary hub 225 can receive RF signals in the second range from the base stations 15 and generate corresponding optical signals (e.g., modulate the RF signals on an optical signal) for transmission on the first optical fiber 39-1. Similarly, the primary hub 225 can receive optical signals from the first optical fiber 39-1 and generate corresponding RF signals in the second range (e.g., de-modulate the RF signals from the optical signal) for transmission to the base stations 15. In one embodiment, the primary hub 225 can be connected to 2 additional strands (e.g., 1 for uplink communications and 1 for downlink communications) of the first optical fiber 39-1 (i.e., in addition to the 2 strands already connected to the primary hub 220).

The first optical fiber 39-1 can be used to connect the primary hub 225 to a secondary hub 255 at the secondary connection area 25. The secondary hub 255 can be used to transfer the optical signals from the primary hub 225 received from the first optical fiber 39-1 to the second optical fiber 39-2. In an embodiment, the secondary hub 255 can de-modulate the RF signals from the optical signal received from the first optical fiber 39-1 and then modulate the RF signals onto another optical signal for transmission via the second optical fiber 39-2. In another embodiment, the secondary hub 255 can provide the optical signal from the first optical fiber 39-1 to the second optical fiber 39-2 without modulation. Similarly, the secondary hub 255 can transfer the optical signals from the second optical fiber 39-2 to the first optical fiber 39-1. In one embodiment, the secondary hub 255 can be connected to 2 additional strands (e.g., 1 for uplink communications and 1 for downlink communications) of the second optical fiber 39-2 (i.e., in addition to the 2 strands already connected to the secondary hub 250). In the embodiment shown in FIG. 3A, the power supply 400 from the secondary hub 255 is coupled to the power connection 402 instead of the power supply 400 from the secondary hub 250. It is to be understood that the power supply 400 from either the secondary hub 250 or secondary hub 255 can be connected to power connection 402 and used to provide power to the remote area 33.

The second optical fiber 39-2 can be used to connect the secondary hub 255 (to a remote unit 335 at the remote area 33. The remote unit 335 can receive optical signals from the second optical fiber 39-2 and generate corresponding RF signals in the second range (e.g., de-modulate the RF signals from the optical signal) for transmission to the mobile communication devices 18. Similarly, the remote unit 335 can receive RF signals in the second range from the mobile communication devices 18 and generate corresponding optical signals (e.g., modulate the RF signals on the optical signal) for transmission via the second optical fiber 39-2.

As shown in FIG. 3B, the primary connection area 22 can include a primary hub 225A (in addition to primary hub 220A) that is coupled to one or more base stations 15. The primary hub 225A can receive RF signals in the second range from the base stations 15 and generate corresponding optical signals (e.g., modulate the RF signals on an optical signal) for transmission on the optical fiber 39. Similarly, the primary hub 225A can receive optical signals from the optical fiber 39 and generate corresponding RF signals in the second range (e.g., de-modulate the RF signals from the optical signal) for transmission to the base stations 15. In one embodiment, the primary hub 225A can be connected to 2 additional strands (e.g., 1 for uplink communications and 1 for downlink communications) of the optical fiber 39 (i.e., in addition to the 2 strands already connected to the primary hub 220A).

In the embodiment shown in FIG. 3B, the power supply 400 from the primary hub 225A is coupled to the power connection 402 instead of the power supply 400 from the primary hub 220A. It is to be understood that the power supply 400 from either the primary hub 220A or primary hub 225 can be connected to power connection 402 and used to provide power to the remote area 33.

The optical fiber 39 can be used to connect the secondary hub 225A to a remote unit 335 at the remote area 33. The remote unit 335 can receive optical signals from the optical fiber 39 and generate corresponding RF signals in the second range (e.g., de-modulate the RF signals from the optical signal) for transmission to the mobile communication devices 18. Similarly, the remote unit 335 can receive RF signals in the second range from the mobile communication devices 18 and generate corresponding optical signals (e.g., modulate the RF signals on the optical signal) for transmission via the optical fiber 39.

Referring to FIGS. 4A and 4B, a DAS 102 is shown that facilitates communications between base stations 15 and mobile communication devices 18 in a first range (e.g., 130 MHz to 2.7 GHz), a second range (e.g., 3 GHz to 6 GHz) and a third range (e.g., frequencies of 24 GHz, 28 GHz, 39 GHz or other frequency in the range of 20 GHz to 40 GHz). The operation of the DAS 102 with respect to communications using the first range and the second range is the same as described above for the DAS 102 of FIGS. 3A and 3B. For communications in the third range, the DAS 102 of FIGS. 4A and 4B can use several of the same components (e.g., optical fiber 39, first optical fiber 39-1, second optical fiber 39-2, power supply 400 and power connection 402) that were used for communications in the first and second ranges. In other words, the DAS 102 from FIGS. 3A and 3B can be expanded (as shown in FIGS. 4A and 4B) to include communications in the third range.

As shown in FIG. 4A, the primary connection area 22 can include equipment to enable the received mmwave signals in the third range from the base stations 15 to be transmitted on the first optical fiber 39-1. In one embodiment, the primary connection area 22 can include a connection 222 that couples the base stations 15 and first optical fiber 39-1. Similarly, the connection 222 can receive signals from the first optical fiber 39-1 and provide corresponding mmwave signals in the third range for transmission to the base stations 15. In one embodiment, the connection 222 can be connected to 4 additional strands (e.g., 2 for uplink communications and 2 for downlink communications) of the first optical fiber 39-1 (i.e., in addition to the 4 strands already connected to the primary hub 220 and primary hub 225).

The first optical fiber 39-1 can be used to connect the connection 222 to a secondary connection 252 at the secondary connection area 25. The secondary connection 252 can be used to transfer the signals from the connection 222 (and base stations 15) received from the first optical fiber 39-1 to the second optical fiber 39-2. Similarly, the secondary connection 252 can transfer the signals from the second optical fiber 39-2 to the first optical fiber 39-1. In one embodiment, the secondary connection 252 can be connected to 4 additional strands (e.g., 2 for uplink communications and 2 for downlink communications) of the second optical fiber 39-2 (i.e., in addition to the 4 strands already connected to the secondary hub 250 and secondary hub 255).

The second optical fiber 39-2 can be used to connect the secondary connection area 25 to a radio 332 at the remote area 33. The radio 332 can receive the signals from the second optical fiber 39-2 and generate corresponding mmwave signals in the third range for transmission to the mobile communication devices 18. Similarly, the radio 332 can receive mmwave signals in the third range from the mobile communication devices 18 and generate corresponding signals for transmission via the second optical fiber 39-2.

As shown in FIG. 4B, the primary connection area 22 can include equipment to enable the received mmwave signals in the third range from the base stations 15 to be transmitted on the optical fiber 39. In one embodiment, the primary connection area 22 can include a connection 222 that couples the base stations 15 and optical fiber 39. Similarly, the connection 222 can receive signals from the optical fiber 39 and provide corresponding mmwave signals in the third range for transmission to the base stations 15. In one embodiment, the connection 222 can be connected to 4 additional strands (e.g., 2 for uplink communications and 2 for downlink communications) of the optical fiber 39 (i.e., in addition to the 4 strands already connected to the primary hub 220A and primary hub 225A).

The optical fiber 39 can be used to connect the primary connection area 22 to a radio 332 at the remote area 33. The radio 332 can receive the signals from the optical fiber 39 and generate corresponding mmwave signals in the third range for transmission to the mobile communication devices 18. Similarly, the radio 332 can receive mmwave signals in the third range from the mobile communication devices 18 and generate corresponding signals for transmission via the optical fiber 39.

In one embodiment, the power supply 400 can provide a power level of about 20 dBm at 2100 MHz for the remote unit 330. The power supply 400 can provide a power level of about 24 dBm at 3500 MHz for the remote unit 335. The power supply 400 can provide a power level of about 40-45 dBm to radio 332 to match the coverage provided by the remote unit 330 and the remote unit 335. In another embodiment, the power level provided by power supply 400 to radio 332 may be greater than 45 dBm (e.g., 60 dBm) based on MPE results. In a further embodiment associated with FIGS. 3A and 4A, depending on the power requirements at the remote area 33, the power supply 400 from the secondary hub 255 and the power supply 400 from the secondary hub 250 can both be coupled to the power connection 402 (or provided by separate power connections 402) to provide additional power to the equipment at the remote area 33. In an additional embodiment associated with FIGS. 3B and 4B, depending on the power requirements at the remote area 33, the power supply 400 from the primary hub 225A and the power supply 400 from the primary hub 220A can both be coupled to the power connection 402 (or provided by separate power connections 402) to provide additional power to the equipment at the remote area 33. If a composite cable is used, the composite cable may have to have a larger diameter to accommodate multiple power connections 402 and/or the increased power level being transmitted.

Referring to FIGS. 5A and 5B, a DAS 102 is shown that facilitates communications between base stations 15 and mobile communication devices 18 in a second range (e.g., 3 GHz to 6 GHz) and a third range (e.g., frequencies of 24 GHz, 28 GHz, 39 GHz or other frequency in the range of 20 GHz to 40 GHz). The operation of the DAS 102 with respect to communications using the second range and the third range is the same as described above for the DAS 102 of FIGS. 4A and 4B. For communications in the second and third ranges, the DAS 102 of FIGS. 5A and 5B can use several of the same components (e.g., optical fiber 39, first optical fiber 39-1, second optical fiber 39-2, power supply 400 and power connection 402) that were previously used for communications in the first, second and third ranges. In other words, the DAS 102 from FIGS. 4A and 4B can be modified (as shown in FIGS. 5A and 5B) to include communications in the second and/or third ranges.

In other embodiments, the DAS 102 can be arranged to facilitate communications between base stations 15 and mobile communication devices 18 in a first range (e.g., 130 MHz to 2.7 GHz) and a third range (e.g., frequencies of 24 GHz, 28 GHz, 39 GHz or other frequency in the range of 20 GHz to 40 GHz). The operation of the DAS 102 with respect to communications using the first range and the third range would be similar to that described above for the DAS 102 of FIGS. 5A and 5B, except that primary hub 225 (from FIG. 5A) would be replaced by primary hub 220, secondary hub 255 (from FIG. 5A) would be replaced by secondary hub 250, primary hub 225A (from FIG. 5B) would be replaced by primary hub 220A and remote unit 335 (from FIGS. 5A and 5B) would be replaced by remote unit 330.

Figure 6:
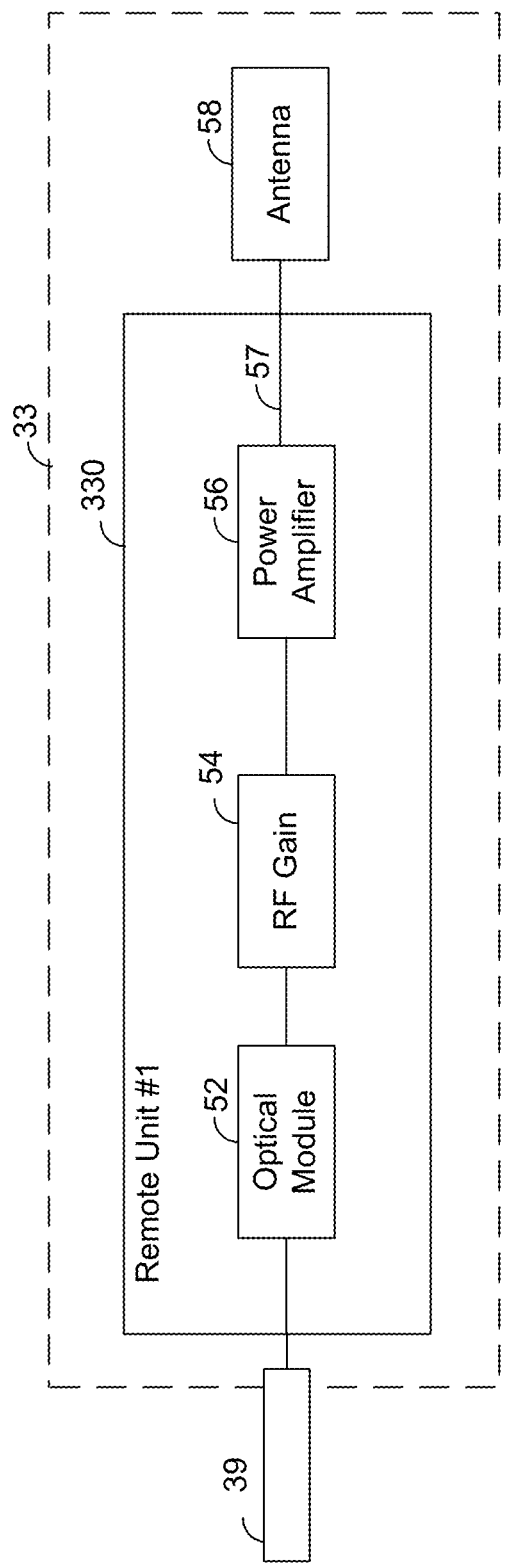
FIG. 6 shows a block diagram of an embodiment of a remote area of a distributed antenna system.
Figure 7:
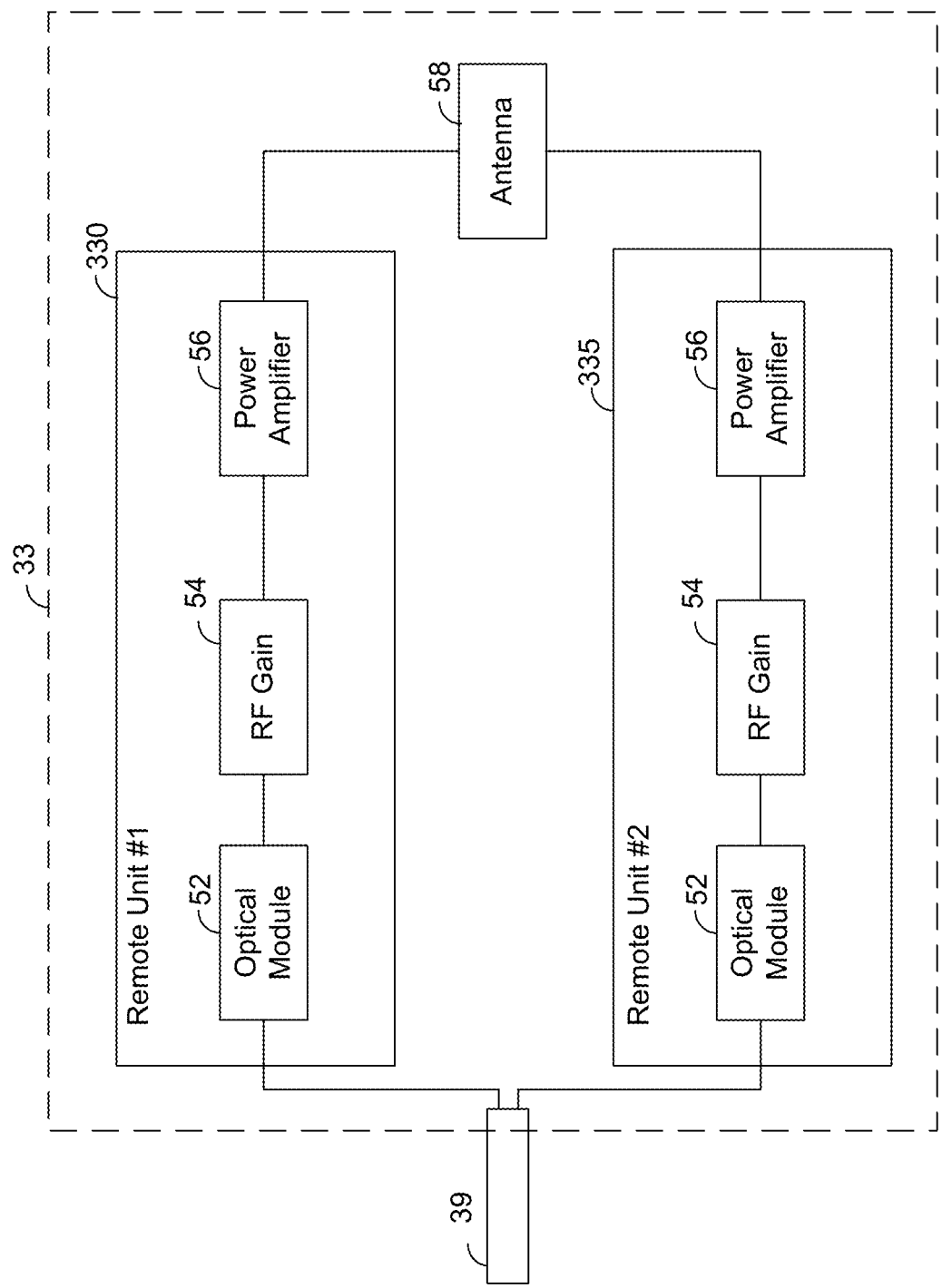
FIG. 7 shows a block diagram of another embodiment of a remote area of a distributed antenna system.

FIGS. 6 and 7 show embodiments of the remote area 33 including the remote unit 330 (FIG. 6) or the remote unit 330 and the remote unit 335 (FIG. 7). The remote unit 330 may communicate with secondary hub 250 via second optical fiber 39-2 (or primary hub 220A via optical fiber 39) and may include an optical module 52, a RF gain stage 54, a power gain stage (or power amplifier) 56, and an electrical communication path 57 that may be coupled to an antenna 58. Optical module 52 may be coupled to an optical fiber 39. In an embodiment, optical module 52 may be coupled to separate downlink and uplink strands of the optical fiber 39, such that optical module 52 (or, in some embodiments, multiple optical modules) provides parallel processing of downlink traffic (e.g., requiring optical to electrical conversion of signals from the primary hub 220 (or primary hub 220A) for the antenna 58) and uplink traffic (e.g., requiring electrical to optical conversion of signals from the antenna 58 for the primary hub 220 (or primary hub 220A). For the downlink signal, the optical module 52 may detect the envelope of an optical carrier signal and output the wideband of RF signals to a RF gain stage 54 without modulation of the underlying RF signals. For the uplink signal, the RF signals may be provided to the optical module 52 from the RF gain stage 54 as a wideband of RF signals, and the optical module 52 may apply a conversion to the optical domain by applying intensity modulation to an optical carrier signal, providing the resulting optical signal to the uplink strand of the optical fiber 39.

RF gain stage 54 may apply a RF gain to the RF signals that are exchanged between the optical module 52 and the antenna 58 (e.g., via power amplifier 56 and electrical communication path 57). In an embodiment as described in more detail herein, the RF gain stage 54 may employ techniques to apply a significant (e.g., 5X, 10X, 20X, 50X) gain to the RF signal received from either the optical module 52 or antenna 58, while avoiding non-linear distortions (e.g., second order non-linear distortions) from being applied to the RF signals by the amplifiers of the gain stage. Moreover, while the RF gain stage 54 is described herein as being employed at the remote unit 330, it will be understood that the RF gain stage 54 as described herein may be employed at any suitable stage of a system (e.g., electrical, optical, wireless, etc.) at which RF signals need to be amplified, for example, at each of primary hub 220 (or primary hub 220A) and secondary hub 250, wherein conversion between optical and electrical signals occurs.

Power amplifier 56, electrical communication path 57 and antenna 58 may provide for the wideband wireless communication interface with the mobile communication devices 18. Power amplifier 56 may accommodate the entire wideband by providing amplification of transmitted and received signals to and from the antenna 58 via electrical communication path 57. The signals may be from a variety of carriers and utilizing a number of different communication protocols. In this manner, multiple different mobile communication devices 18 within the physical range of the power amplifier 56 and antenna 58 may transmit and receive communications in the first range over their communication networks via DAS 102. In an embodiment, the operation of the remote unit 335 shown in FIG. 7 is similar to the operation of the remote unit 330 except that the remote unit 335 is able to transmit and receive communications in the second range and use the same antenna 58 as the remote unit 330.

FIG. 8 depicts an embodiment of an optical module 52 (e.g., of remote units 330, 335, primary hubs 220, 220A, 225, 225A, or secondary hubs 250, 255). The optical module 52 of FIG. 8 has an optical receiver 66 that is coupled to a downlink fiber of an optical fiber 39, such as downlink fiber 39D of the optical fiber 39 that can also be coupled to the primary hub 220 (or primary hub 220A) or secondary hub 250. The optical receiver 66 is configured to receive an optical signal carried by the optical fiber 39 and convert the received signal from the optical domain to the electrical domain. As an example, the optical receiver 66 may include an avalanche photodiode (APD) and associated circuitry for biasing the APD so that the APD has a desired sensitivity for appropriately converting the optical signal to an electrical signal depending on the expected characteristics, such as received signal strength, of the optical signal.

The electrical signal that is output by the optical receiver 66 may be provided to conversion circuitry 67. In an embodiment, conversion circuitry 67 may remove signal content that was added to the underlying RF signal for optical transmission, such as an optical carrier signal. The resulting RF signal may be output for eventual transmission by an antenna 58 (e.g., to a gain stage 54 that amplifies the received electrical signal received via the optical receiver 66, thereby providing a gain (G) to such signal). The gain stage 54 has circuitry (e.g., one or more RF power amplifiers) for amplifying an electrical signal, and the gain stage 54 processes the received electrical signal in a manner that eliminates second order harmonic distortion without requiring complex, lossy, and/or bulky circuitry.

The optical module 52 of FIG. 8 can also have an optical transmitter 68 that is coupled to an uplink strand of an optical fiber 39, such as uplink strand 39u of the optical fiber 39. The optical transmitter 68 is configured to receive an electrical signal from the conversion circuitry 69 and convert this signal from the electrical domain to the optical domain. In an embodiment, conversion circuitry 69 may add signal content to the underlying RF signal for optical transmission, such as an optical carrier signal. The resulting signal from the conversion circuitry 69 can be output to the optical transmitter 68 for eventual transmission to the primary hub 220 or secondary hub 250 via optical fiber 39.

The RF signal received by the antenna 58 may be amplified with the gain stage 54 before being received by the conversion circuitry 69. The gain stage 54 has circuitry (e.g., one or more RF power amplifiers) for amplifying an electrical signal, and the gain stage 54 processes the received electrical signal in a manner that eliminates second order harmonic distortion without requiring complex, lossy, and/or bulky circuitry.

Note that each of the optical modules 52 may also have an optical transmitter 68 and conversion circuitry 69 similar to the optical receiver 66 and conversion circuitry 67 in the upstream direction, applying an optical carrier to an electrical signal and converting the electrical signal to an optical signal. Similarly, there will be electrical to optical conversions in the downlink path (e.g., at a hub providing an optical signal to another hub or to a remote unit) and optical to electrical conversions in the downlink path (e.g., at a hub receiving an optical signal from another hub or from a remote unit).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the scope of the following claims.

As a further example, variations of apparatus or process parameters (e.g., dimensions, configurations, components, process step order, etc.) may be made to further optimize the provided structures, devices and methods, as shown and described herein. The structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A distributed antenna system (DAS) for a communication system, comprising:
   a primary connection area comprising first equipment configured to communicate first signals in a first communication frequency range with a first network communications device and to communicate second signals in a second communication frequency range with a second network communications device, wherein the first communication frequency range is distinct from the second communication frequency range;
   a first optical fiber connected to the first equipment, the first optical fiber having at least one first strand for communication of first signals in the first communication frequency range and at least one second strand for communication of second signals in the second communication frequency range;
   a secondary connection area comprising second equipment connected to the first optical fiber;
   a second optical fiber connected to the second equipment, the second optical fiber having at least one first strand for communication of first signals in the first communication range and at least one second strand for communication in the second communication range; and
   a remote area comprising third equipment connected to the second optical fiber, the third equipment configured to communicate first signals in a first communication frequency range with a first mobile communication device and to communicate second signals in a second communication frequency range with a second mobile communications device.

2. The DAS of claim 1, wherein the first signal is a radio frequency (RF) signal and the second signal is one of an RF signal or a millimeter wave signal.

3. The DAS of claim 1, wherein the first equipment comprises at least one primary hub connected to the first network communications device and the first optical fiber and a first millimeter wave connection connected to the second network communications device and the first optical fiber.

4. The DAS of claim 3, wherein the second equipment comprises at least one secondary hub connected to the first optical fiber and the second optical fiber and a second millimeter wave connection connected to the first optical fiber and the second optical fiber.

5. The DAS of claim 4, wherein the third equipment comprises at least one remote unit connected to the second optical fiber and a millimeter wave radio connected to the second optical fiber, wherein the at least one remote unit is configured to communicate first signals in the first communication frequency range with the first mobile communication device and the millimeter wave radio is configured to communicate second signals in the second communication frequency range with the second mobile communication device.

6. The DAS of claim 5, wherein the at least one secondary hub includes a power supply, and wherein the power supply provides power to the at least one remote unit and the millimeter wave radio via a power cable.

7. The DAS of claim 6, wherein the power supply is configured to provide different power levels to the at least one remote unit and the millimeter wave radio such that the at least one remote unit and the millimeter wave radio have substantially similar coverage areas.

8. The DAS of claim 1, wherein the at least one first strand of each of the first optical fiber and the second optical fiber includes a strand for uplink communication and a strand for downlink communication and the at least one second strand of each of the first optical fiber and the second optical fiber includes a strand for uplink communication and a strand for downlink communication.

9. The DAS of claim 1, wherein the first equipment is further configured to communicate third signals in a third communication frequency range with a third network communications device, wherein the third communication frequency range is distinct from both the first communication frequency range and the second communication frequency range, and wherein the first optical fiber has at least two third strands for communication of third signals in the third communication frequency range.

10. The DAS of claim 9, wherein the second equipment is configured to facilitate communication of third signals in the third communication frequency range between the first optical fiber and the second optical fiber, and the third equipment configured to communicate third signals in the third communication frequency range with a third mobile communication device.

11. A distributed antenna system (DAS) for a communication system, comprising:
   a connection area comprising first equipment configured to communicate first signals in a first communication frequency range with a first network communications device and to communicate second signals in a second communication frequency range with a second network communications device, wherein the first communication frequency range is distinct from the second communication frequency range;
   an optical fiber connected to the first equipment, the optical fiber having at least one first strand for communication of first signals in the first communication frequency range and at least one second strand for communication of second signals in the second communication frequency range; and
   a remote area comprising second equipment connected to the optical fiber, the second equipment configured to communicate first signals in a first communication frequency range with a first mobile communication device and to communicate second signals in a second communication frequency range with a second mobile communications device.

12. The DAS of claim 11, wherein the first signal is a radio frequency (RF) signal and the second signal is one of an RF signal or a millimeter wave signal.

13. The DAS of claim 11, wherein the first equipment comprises at least one hub connected to the first network communications device and the first optical fiber and a first millimeter wave connection connected to the second network communications device and the first optical fiber.

14. The DAS of claim 13, wherein the second equipment comprises at least one remote unit connected to the optical fiber and a millimeter wave radio connected to the optical fiber, wherein the at least one remote unit is configured to communicate first signals in the first communication frequency range with the first mobile communication device and the millimeter wave radio is configured to communicate second signals in the second communication frequency range with the second mobile communication device.

15. The DAS of claim 14, wherein the at least one hub includes a power supply, and wherein the power supply provides power to the at least one remote unit and the millimeter wave radio via a power cable.

16. The DAS of claim 15, wherein the power supply is configured to provide different power levels to the at least one remote unit and the millimeter wave radio such that the at least one remote unit and the millimeter wave radio have substantially similar coverage areas.

17. The DAS of claim 11, wherein the first equipment is further configured to communicate third signals in a third communication frequency range with a third network communications device, wherein the third communication frequency range is distinct from both the first communication frequency range and the second communication frequency range, and wherein the optical fiber having at least two third strands for communication of third signals in the third communication frequency range.

18. The DAS of claim 17, wherein the second equipment is configured to communicate third signals in the third communication frequency range with a third mobile communication device.

19. The DAS of claim 11, wherein the at least one first strand of the optical fiber includes a strand for uplink communication and a strand for downlink communication and the at least one second strand of the optical fiber includes a strand for uplink communication and a strand for downlink communication.

* * * * *